(12) United States Patent
Sommer et al.

(10) Patent No.: US 7,142,619 B2
(45) Date of Patent: Nov. 28, 2006

(54) LONG SUBSCRIBER LOOPS USING AUTOMATIC GAIN CONTROL MID-SPAN EXTENDER UNIT

(75) Inventors: Jeremy Sommer, Mountain View, CA (US); Kishan Shenoi, Saratoga, CA (US); Kamila Kraba, Santa Clara, CA (US); Sandro Squadrito, San Jose, CA (US); Gary Bogardus, San Carlos, CA (US)

(73) Assignee: Symmetricom, Inc., San Jose, CA (US)

( * ) Notice: Subject to any disclaimer, the term of this patent is extended or adjusted under 35 U.S.C. 154(b) by 620 days.

(21) Appl. No.: 09/843,161

(22) Filed: Apr. 25, 2001

(65) Prior Publication Data

US 2002/0105964 A1    Aug. 8, 2002

Related U.S. Application Data

(60) Provisional application No. 60/199,930, filed on Apr. 26, 2000.

(51) Int. Cl.
*H04L 27/08*    (2006.01)

(52) U.S. Cl. ...................... 375/345; 375/211; 375/213; 375/220; 375/224

(58) Field of Classification Search ................ 375/345, 375/247, 220, 224, 211, 213; 320/18.1, 13.3, 320/226, 315, 463; 379/417; 455/127.1
See application file for complete search history.

(56) References Cited

U.S. PATENT DOCUMENTS

| | | | | |
|---|---|---|---|---|
| 4,131,766 A | | 12/1978 | Narasimha ................... 370/484 |
| 4,237,551 A | | 12/1980 | Narasimha ................... 370/307 |
| 4,606,043 A | | 8/1986 | Aprille, Jr. et al. ......... 375/230 |
| 4,941,200 A | * | 7/1990 | Leslie et al. .................. 455/17 |
| 5,095,528 A | * | 3/1992 | Leslie et al. .................. 455/10 |
| 5,617,450 A | | 4/1997 | Kakuishi et al. ............ 375/230 |
| 5,627,501 A | | 5/1997 | Biran et al. ................. 333/17.1 |

(Continued)

FOREIGN PATENT DOCUMENTS

EP    0 338 804    10/1989

(Continued)

OTHER PUBLICATIONS

Wang et al., "Automatic gain control VLSI architecture foe ADSL-1 cap system," *Journal of the Chinese Institute of Electrical Engineering.*, pp. 261-268, 1995.

(Continued)

*Primary Examiner*—Chieh M. Fan
*Assistant Examiner*—Ted M. Wang
(74) *Attorney, Agent, or Firm*—John Bruckner PC

(57) ABSTRACT

Systems and methods are described for long subscriber loops using automatic gain control. A method includes extending a digital subscriber loop including: producing an output signal in a first direction from a variable gain amplifier at a mid-span extender unit responsive to an input signal in the first direction from the digital subscriber loop; monitoring a signal strength of said output signal in the first direction at the mid-span extender unit; generating a gain control signal responsive to the signal strength at the mid-span extender unit; controlling a gain of the variable gain amplifier at the mid-span extender unit responsive to the gain control signal; and controlling a second gain of a second variable gain amplifier at said mid-span extender unit responsive to said gain control signal to produce an output signal in a second direction from said second variable gain amplifier at said mid-span extender unit responsive to a second input signal in said second direction from said digital subscriber loop.

1 Claim, 7 Drawing Sheets

U.S. PATENT DOCUMENTS

| | | | | |
|---|---|---|---|---|
| 5,678,198 | A | * | 10/1997 | Lemson .................. 455/67.11 |
| 5,790,174 | A | | 8/1998 | Richard, III et al. ......... 725/99 |
| 5,883,941 | A | | 3/1999 | Akers ..................... 379/93.08 |
| 5,956,323 | A | | 9/1999 | Bowie ........................ 370/241 |
| 6,023,612 | A | * | 2/2000 | Harris et al. ............. 455/127.1 |
| 6,029,048 | A | | 2/2000 | Treatch ........................ 455/7 |
| 6,118,766 | A | | 9/2000 | Akers ........................ 370/249 |
| 6,130,882 | A | | 10/2000 | Levin ......................... 370/252 |
| 6,141,330 | A | | 10/2000 | Akers ......................... 370/264 |
| 6,236,664 | B1 | * | 5/2001 | Erreygers .................. 370/492 |
| 6,236,726 | B1 | * | 5/2001 | Darveau ..................... 379/417 |
| 6,583,899 | B1 | * | 6/2003 | Casanova et al. ............. 398/9 |
| 6,625,116 | B1 | * | 9/2003 | Schneider et al. .......... 370/226 |
| 6,671,502 | B1 | * | 12/2003 | Ogawa .................... 455/127.1 |

FOREIGN PATENT DOCUMENTS

| | | |
|---|---|---|
| GB | 2 337 380 A | 11/1999 |
| KR | 0065094 | 8/1999 |

OTHER PUBLICATIONS

"HomePortal™ 1000: Bringing the power of DSL Home," *2Wire, Inc.* brochure, 1999.

"Analog front end for ADSL extends linearity and local-loop length," Article from the *END magazine* web site at: www.ednmag.com, Jan. 21, 1999.

"DSL is coming! DSL is coming!," Article from the *Teleconnect* web site at: www.teleconnect.com, Sep. 5, 2000.

"Communications companies stay ahead of the curve," Article from the *NetWorkFusion* web site at: www.nwfusion.com, Dec. 18, 2000.

"Microfilter design promises peaceful coexistence between ADSL and the voiceband. (Technology Information)," *EDN magazine* article as it appears on the FindArticles web site at: www.findarticles.com, Dec. 9, 1999.

"GDSL: GTE selects GoDigital's GDSL-8 access system: GDSL-8 system quickly meets the demand for GTE's added line growth," *EDGE* article as it appears on the FindArticles web site at: www.findarticles.com, Sep. 28, 1999.

"GoDigital Networks Increases reliability of DSL services and extends reach to 25 miles from central office," *PR Newswire* article as it appears on the FindArticles web site at: www.findarticles.com, Oct. 13, 1999.

"GDSL-8: GoDigital Telecommunications, Inc. introduces four line drop flexibility with its GDSL-8 digital replacement system for analog carrier, meeting increased local loop line demand and internet access speeds. (Product Announcement)," *EDGE* article as it appears on the FindArticles web site at: www.findarticles.com, Feb. 8, 1999.

"GoDigital Telecommunications, Inc. introduces long loop high speed internet access support with its GDSL BRI-3 product line," *Business Wire* article as it appears on the FindArticles web site at: www.findarticles.com, Mar. 22, 1999.

"Microfilter design promises peaceful coexistence between ADSL and the voiceband. (Technology Information)," *EDN* article as it appears on the FindArticles web site at: www.findarticles.com, Dec. 9, 1999.

"GoDigital networks adds extended range drops to serve hard-to-reach subscribers," *PR Newswire* article as it appears on the FindArticles web site at: www.findarticles.com, Jan. 18, 2000.

"The next big home networking thing, (Technology Information)," *Home Office Computing* article as it appears on the FindArticles Web site at: www.findarticles.com, Mar. 2000.

"Intranets and I-commerce-hotlinks (news briefs)," *InfoWorld* article as it appears on the FindArticles web site at: www.findarticles.com, Mar. 6, 2000.

"The fastest towns in America (Technology Information)," *Home Office Computing* article as it appears on the FindArticles web site at: www.findarticles.com, Apr. 2000.

"2Wire Inc. (2W HomePortal)," *America's Network* article as it appears on the FindArticles web site at: www.findarticles.com, Jun. 1, 2000.

"Symmetricom's new GoLong solution doubles current reach of ADSL, enabling ADSL everywhere," *Business Wire* Article as it appears on the FindArticles web site at: www.findarticles.com, Jun. 7, 2000.

"TriMedia boxes ready soon," *Electronics Times* article as it appears on the FindArticles web site at: www.findarticles.com, Sep. 18, 2000.

"General bandwidth and 2Wire partner to deliver VoDSL solution for the residential market," *Cambridge Telecom Report* article as it appears on the FindArticles web site at: www.findarticles.com, Jun. 5, 2000.

"Office Depot and 2Wire announce strategic retail partnership for leading residential Gateway products," *EDGE: Work-Group Computing Report* article as it appears on the FindArticles web site at: www.findarticles.com, Jun.5, 2000.

"GoDigital Networks first to introduce line-powered solution for delivering both voice and DSL to any location," *PR Newswire* article as it appears on the FindArticles web site at: www.findarticles.com, Jun. 6,2000.

"The 39 (Network) Steps. (News Briefs)," *Home Office Computing* article as it appears on the FindArticles web site at: www.findarticles.com, Aug. 2000.

"2Wire delivers HomePortal residential Gateway to consumers for ultra-fast internet access and easy home networking," *Business Wire* article as it appears on the FindArticles web site at: www.findarticles.com, Oct. 10, 2000.

"Independent laboratory testing confirms that Symmetricom's GoLong doubles the reach of ADSL services," *Business Wire* article as it appears on the FindArticles web site at: www.findarticles.com, Nov. 7, 2000.

"Chester Telephone doubles the serving distance of its DSL services using Symmetricom's GoLong loop extender; field trials to begin in Chester, S.C. mid-Dec. 2000," *Business Wire* article as it appears on the FindArticles web site at: www.findarticles.com, Dec. 4, 2000.

"Symmetricom's Go-Long loop extender doubles the serving distance of Chester Telephone's DSL services; field trials to begin in Chester, S.C. mid-Dec. 2000," *Business Wire* article as it appears on the FindArticles web site at: www.findarticles.com, Dec. 4, 2000.

"Symmetricom replaces headline in Chester Telephone release; Symmetricom's Go-Long loop extender doubles the serving distance of Chester Telephone's DSL services," *Business Wire* article as it appears on the FindArticles web site at: www.findarticles.com, Dec. 4, 2000.

* cited by examiner 1.0-A : EXTENDER SPACING = 6000 FEET; LOAD COILS = 88 mH
1.0-B : EXTENDER SPACING = X (TBD); NO LOAD COILS

LONG SUBSCRIBER LOOPS USING AUTOMATIC GAIN CONTROL MID-SPAN EXTENDER UNIT

CROSS-REFERENCE TO RELATED APPLICATION

This application is related to, and claims a benefit of priority under 35 U.S.C. 119(e) and/or 35 U.S.C. 120 of U.S. Ser. No. 60/199,930, filed Apr. 26, 2000, now pending, the entire contents of which are hereby incorporated by reference for all purposes.

BACKGROUND OF THE INVENTION

1. Field of the Invention

The invention relates generally to the field of communications. More particularly, the invention relates to digital subscriber loop (DSL) communications. Specifically, a preferred implementation of the invention relates to extending the range of an asymmetric digital subscriber loop (ADSL). The invention thus relates to ADSL of the type that can be termed extended.

2. Discussion of the Related Art

Conventional telephony, often called plain old telephone service (POTS), is provided to customers over copper cable. This copper cable can be termed a subscriber loop or a subscriber line. Modern loop plant designs specify the use of 26-gauge cable for short to medium loop lengths with 24-gauge cable used to extend the range. Legacy loop plant includes cable of 22-gauge as well as 19-gauge.

At the customer premises, a telephone set is typically connected to the cable. The other end of the cable is connected to a line circuit module in the service provider's central office (CO). Switches terminating customer loops at the central office are regarded as Class-5 switches and provide a dial-tone. The customer premise equipment (CPE) can include a personal computer (PC) modem.

Older central office switches were analog in nature and were unable to provide a broad range of services. Modern central office switches are digital. Digital switches include codecs in the line circuit to do the bilateral analog-digital (A/D) conversion; the transmission over the loop is analog and the signals occupy a frequency band of up to (approximately) 4 kHz. Conventional telephony codecs convert at an 8 kHz sampling rate and quantize to 8 bits per sample corresponding to a net bit rate of 64 kbps (or "DS0").

With the advent of digital terminal equipment, such as personal computers, modems were developed to carry digital bit streams in an analog format over the cable pair. Because of the 4 kHz constraint imposed by the A/D converter in the line circuit, the data rate of such transmission is limited and is typically 9.6 kbps. More elaborate schemes have been proposed which permit higher bit rates (e.g. V.34 which can do in excess of 28.8 kbps). More recently, there are schemes that "spoof" the D/A converter in the line-circuit and operate at bit rates as high as 56 kbps in the downstream direction (from CO to CPE). With increasing deployment of, and consequently demand for, digital services it is clear that this bit rate is insufficient.

An early proposal to increase the information carrying capacity of the subscriber loop was ISDN ("Integrated Services Digital Network"), specifically the BRI ("Basic Rate Interface") which specified a "2B+D" approach where 2 bearer channels and one data channel (hence 2B+D) were transported between the CO and the CPE. Each B channel corresponded to 64 kbps and the D channel carried 16 kbps. With 16 kbps overhead, the loop would have to transport 160 kbps in a full duplex fashion. This was the first notion of a Digital Subscriber Loop ("DSL") (or Digital Subscriber Line). However, this approach presumed that POTS and 2B+D would not coexist (simultaneously). The voice codec would be in the CPE equipment and the "network" would be "all-digital". Most equipment was designed with a "fallback" whereby the POTS line-circuit would be in a "standby" mode and in the event of a problem such as a power failure in the CPE, the handset would be connected to the loop and the conventional line-circuit would take over. There are several ISDN DSLs operational today.[1-2]

Asymmetric digital subscriber loop (ADSL) was proposed to provide a much higher data rate to the customer in a manner that coexisted with POTS. Recognizing that the spectral occupancy of POTS is limited to low frequencies, the higher frequencies could be used to carry data (the so-called Data over Voice approach). Nominally, ADSL proposed that 10 kHz and below would be allocated to POTS and the frequencies above 10 kHz for data. Whereas the nominal ADSL band is above 10 kHz, the latest version of the standard specifies that the "useable" frequency range is above 20 kHz. This wide band between 4 kHz and the low edge of the ADSL band simplifies the design of the filters used to segregate the bands.

Furthermore, it was recognized that the downstream data rate requirement is usually much greater than the upstream data rate requirement. Several flavors ("Classes") of ADSL have been standardized, involving different data rates in the two directions. The simplest is Class-4 which provides (North American Standard) 1.536 Mbps in the downstream direction and 160 kbps in the upstream direction. The most complicated, Class-1, provides about 7 Mbps downstream and 700 kbps upstream.[3-4]

A stumbling block in specifying, or guaranteeing, a definite bit rate to a customer is the nature of the loop plant. Customers can be at varied geographical distances from the central office and thus the length of the subscriber loop is variable, ranging from short (hundreds of feet) to long (thousands of feet) to very long (tens of thousands of feet). The essentially lowpass frequency response of subscriber cable limits the usable bandwidth and hence the bit rate.

Moreover, loops longer than (approximately) 18 thousand feet have a lowpass characteristic that even affects the voiceband. Such loops are specially treated by the addition of load coils and are called "loaded loops". The principle is to splice in series-inductors which have the impact of "boosting" the frequency response at (approximately) 4 kHz with the secondary effect of increasing the attenuation beyond 4 kHz very substantially. In these loaded loops, the spectral region above 10 kHz is unusable for reliable transmission. Consequently, the categorical statement can be made that DSL (including ADSL, "2B+D", and other flavors of DSL) cannot be provided over long loops and definitely cannot be provided over loaded loops.

Heretofore, there has not been a completely satisfactory approach to providing DSL over long loops. Further, there has not been a satisfactory approach to providing DSL over loaded loops. What is needed is a solution that addresses one, or both, of these requirements. The invention is directed to meeting these requirements, among others.

SUMMARY OF THE INVENTION

There is a need for the following embodiments. Of course, the invention is not limited to these embodiments.

One embodiment of the invention is based on a method, comprising: extending a digital subscriber loop including: producing an output signal from said first variable gain amplifier responsive to an input signal from said digital subscriber loop; monitoring a signal strength of said output signal; generating a gain control signal responsive to said signal strength; and controlling a gain of said variable gain amplifier responsive to said gain control signal. Another embodiment of the invention is based on an apparatus, comprising a digital subscriber loop extender circuit including: a variable gain amplifier having a gain and providing an output signal in response to an input signal from a signal generator over a transmission medium, said output signal having a signal strength as a function of said gain; and a controller coupled to said variable gain amplifier, said controller generating a gain control signal that is feed back to said variable gain amplifier to automatically control said gain.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
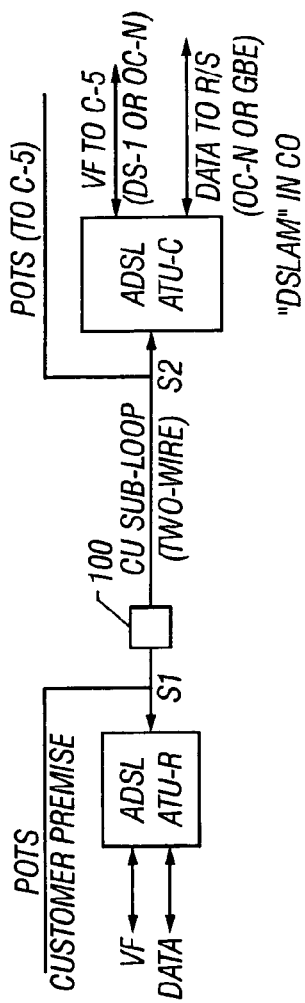
FIG. 1 illustrates a block schematic view of the more important components of an ADSL repeater equipped subscriber loop, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application several publications are referenced by Arabic numerals within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent Applications disclose embodiments that were satisfactory for the purposes for which they are intended. The entire contents of U.S. patent application Ser. No. 09/476,770, filed Jan. 3, 2000; U.S. patent application Ser. No. 09/821,841, filed Mar. 28, 2001, (now U.S. Pat. No. 6,507,606); U.S. patent application Ser. No. 09/836,889, filed Apr. 16, 2001, (now abandoned); and U.S. patent application Ser. No. 09/838,575, filed Apr. 18, 2001, (now U.S. Pat. No. 6,842,426) are hereby expressly incorporated by reference herein for all purposes.

The context of the invention includes digital subscriber loops. One species of digital subscriber loops is an asymmetrical digital subscriber loop. A preferred embodiment of the invention using ADSL repeaters (in place of load coils) enables a form of ADSL that uses the technique of frequency-division-duplexing to be provided to customers over very long loops.

The agreed upon standard for ADSL is the DMT (Discrete Multi-Tone) method. A premise underlying DMT is that the channel, namely the subscriber loop, does not have a "flat" frequency response. The attenuation at 1 Mhz ("high" frequency) can be as much as 60 dB greater than at 10 kHz ("low" frequency). Furthermore this attenuation varies with the length of the cable. By using Digital Signal Processing ("DSP") techniques, specifically the theory of the Discrete Fourier Transform ("DFT") and Fast Fourier Transform ("FFT") for efficient implementation, the DMT method splits the available frequency band into smaller sub-channels of (approximately) 4 kHz. Each sub-channel is then loaded with a data rate that it can reliably support to give the desired aggregate data rate. Thus lower (center-)frequency sub-channels will normally carry a greater data rate than the sub-channels at higher (center-)frequencies.

The underlying principle of the DSL repeater is the need to combat the loss in the actual cable (subscriber loop). This is achieved by introducing gain. Since amplifiers are for the most part uni-directional devices, one approach is to perform a 2w-to-4w conversion and put amplifiers in each direction. This is most easily achieved when the directions of transmission are in disjoint spectral bands. That is, if the directions of transmission are separated in frequency (i.e. frequency-division duplexing), then simple filter arrangements can provide the separation.

Most loop plant provides for access to the cable, which may be buried underground, approximately every 6000 feet. This was the practice to allow for the provision of load coils. Thus the natural separation between repeaters is (approximately) 6000 feet. The repeater may be placed in parallel with a load coil if the DSL needs to coexist with POTS.

Referring to FIG. 1, a general architecture for providing an asymmetric digital subscriber loop (ADSL) is depicted. A subscriber loop is the actual two-wire copper pair that originates at the Central Office and terminates at the subscriber's premise. For providing ADSL over long loops, an ADSL repeater, 100, may be included. At the customer premise the handset (POTS) is "bridged" onto the subscriber loop at point labeled S1. In some forms of ADSL this bridging can be achieved using passive filters (called a "splitter") to demarcate the frequency bands where voice and data reside. Similarly, a splitter may be employed at the central office (CO) at point S2. Central office equipment that interfaces to ADSL provisioned lines is often embodied as a multiplexer called a "DSLAM" (Digital Subscriber Line Access Multiplexer). The data component is aggregated into an optical or high-bit-rate signal for transport to the appropriate terminal equipment. The capacity of ADSL allows for additional voice circuits (shown as VF in FIG. 1) to be carried in digital format as part of the ADSL data stream. This content is usually (though not always) destined for a Class-5 switch.

The term approximately, as used herein, is defined as at least close to a given value (e.g., preferably within 10% of, more preferably within 1% of, and most preferably within 0.1% of). The term coupled, as used herein, is defined as connected, although not necessarily directly, and not necessarily mechanically. The term substantially, as used herein, is defined as at least approaching a given state (e.g., preferably within 10% of, more preferably within 1% of, and most preferably within 0.1% of).

Given that a large installed loop plant exists, the invention can include retrofit installation. Part of the retrofit installation procedure involves removal of all load coils, and bridge-taps that may be present on the (existing) subscriber loop. Based on telephone company records, the (approximate) distance between the subscriber premise and the serving Central Office can be estimated to decide whether DSL can be provided in the first place. If DSL can indeed be provided, an estimate of the class (and thus the data carrying capacity) is made. If not, then the telephone company may choose to provide a lower bit-rate service such as BRI or, in some cases, not be able to provide any service beyond POTS.

Signals from both directions can coexist on the cable pair and such transmission is referred to as "2-wire". This form is perfectly adequate for analog signals (speech). In digital transmission systems the two directions are separated (logically, if not physically) and such transmission is termed "4-wire". Two common approaches to achieving this action are "echo canceling" and frequency-division-duplexing ("FDD"). Both approaches can be supported by the DMT method.

Figure 2:
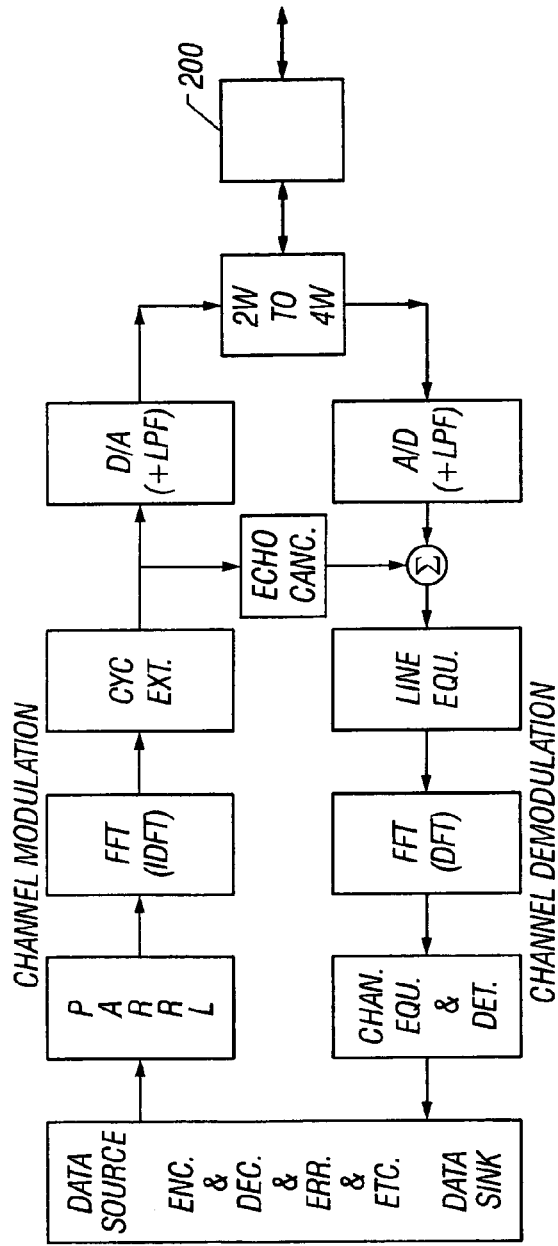
FIG. 2 illustrates a block schematic view of the more important elements of a DMT signal processing flow (echo canceling mode), representing an embodiment of the invention.

Referring to FIG. 2, a signal processing flow in a DMT-based ADSL transmission unit ("ATU") that employs echo cancellation is depicted. The transmit ("modulation" direction) side is considered first. The data to be transmitted is first processed to include error correction by a ENC. & DEC. & ERR. & ETC. unit. It is then formatted into multiple "parallel" channels via a PARRL processing unit. It is then placed in the appropriate frequency slot via a FFT processing unit. The notion of "cyclic extension" is unique to DMT and involves increasing the sampling rate by insertion of additional samples via a CYC. EXT. processing unit. This composite signal is converted to analog via a D/A converter and coupled to the line via a 2w-to-4w converter. An ADSL repeater 200 is coupled to the 2w-to-4w converter.

Ideally the entire signal from the D/A converter is transmitted to the distant end via the 2w-to-4w converter. However, in practice some amount "leaks" from the 2w-to-4w converter toward a A/D converter. This leakage can be termed the "echo."

The receive side ("demodulation" direction) is now considered. The signal from the distant end arrives at the 2w-to-4w converter via the repeater 200 and is directed to the A/D converter for conversion to digital format. Subsequent processing includes line equalization via the LINE EQU. unit, fast Fourier transformation via the FFT unit and then channel equalization and data detection via the CHAN. EQU. & DET. unit. Processing is then handed to the unit that does the error detection and/or correction and reorganizing into the appropriate format. To remove the echo (the component of the transmit signal that leaks across the 2w-to-4w converter) an echo cancellation filter is employed. This is a digital filter that mimics the echo path and thus the output of the filter labeled "Echo Canc" is a "replica" of the echo and by subtraction of this signal from the received signal at a summation unit, the net echo can be substantially reduced. Thus 4w operation is achieved even though the medium is merely 2w. The spectral content of signals in the two directions can have significant overlap but are sufficiently separated by the echo cancellation technique.

Figure 3:
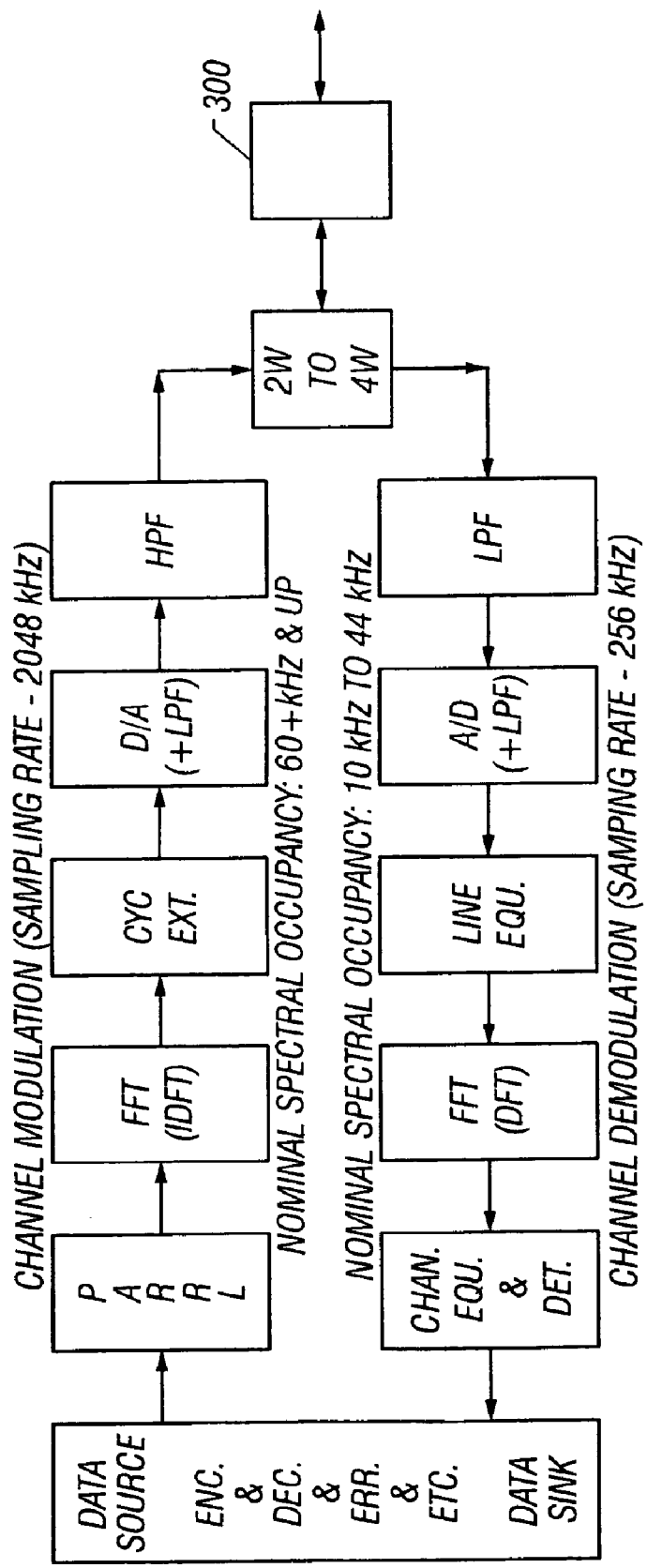
FIG. 3 illustrates a block schematic view of a frequency-division duplexing mode for DMT-based ADSL (central office end shown), representing an embodiment of the invention.

Referring to FIG. 3, a frequency-division duplexing (FDD) mode of DMT for ADSL is depicted. The "back-end" of the FDD version of DMT-based ADSL is substantially the same as the echo-canceling version illustrated in FIG. 2.

Referring again to FIG. 3, the frequency range used for Upstream versus Downstream is vendor specific. Standards-compliant ADSL uses a total bandwidth of roughly 20 kHz to 1.1 MHz. In a preferred embodiment, the upstream occupies between 20 kHz and $X_1$ kHz whereas the downstream signal occupies the band between $X_2$ kHz and 1.1 MHz. $X_2$ should be substantially greater than $X_1$ to allow for frequency roll-off of the filters used to demarcate the upstream and down-stream bands. One suitable choice is $X_1=110$ kHz and $X_2=160$ kHz. The specific choice of these band edges can be made a design parameter and different "models" of the repeater can be fabricated with different choices of band edges.

Still referring to FIG. 3, a high pass filter HPF unit is coupled to the D/A units. A 2w-to-4w converter is coupled to the HPF unit. The 2w-to-4w converter is also coupled to a low pass filter LPF unit which is in-turn coupled to the A/D unit. An ADSL repeater 300 is coupled to the 2w-to-4w converter.

The underlying principle of the ADSL extender is the need to combat the loss in the actual cable (subscriber loop).

This is achieved by introducing gain. Since amplifiers are for the most part unidirectional devices, we need to, in essence, perform a 2w-to-4w conversion and put amplifiers in each direction. This is most easily achieved when the directions of transmission are in disjoint spectral bands. That is, if the directions of transmission are separated in frequency (i.e. frequency-division duplexing), then simple filter arrangements can provide the separation.

Most loop plant provide for access to the cable, which may be buried underground, approximately every 6000 feet. This was the practice to allow for the provision of load coils. Thus, the natural separation between repeaters is (approximately) 6000 feet. The repeater may be placed in parallel with a load coil if the ADSL needs to coexist with POTS.

Figure 4:
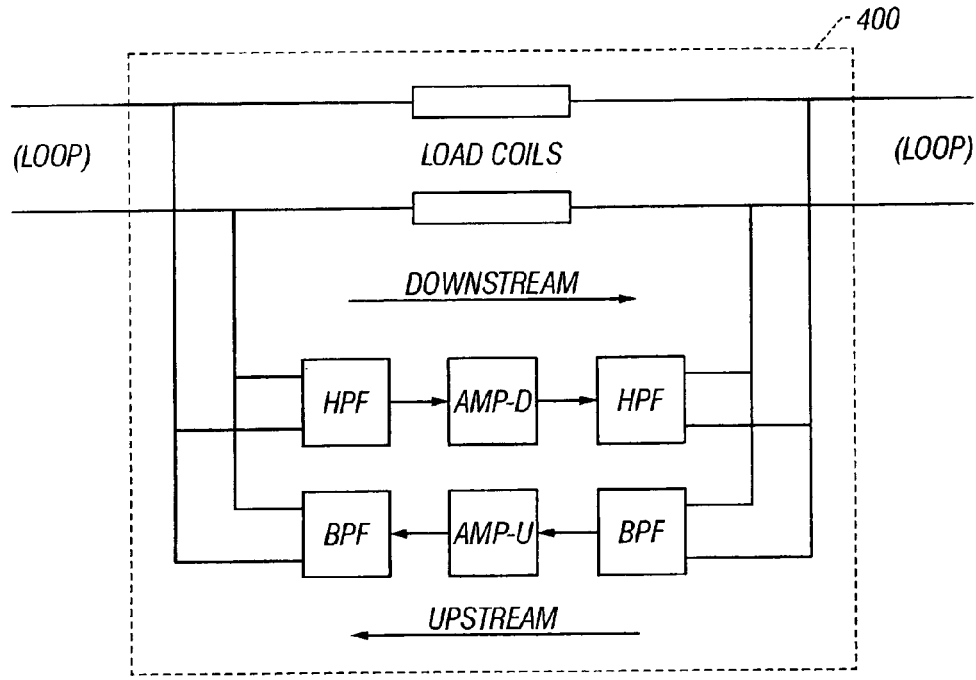
FIG. 4 illustrates a block schematic view of an exemplary asymmetric digital subscriber loop repeater, representing an embodiment of the invention.

The particular description of an ADSL repeater provided in FIG. 4 is suitable for the DMT-based ADSL transmission scheme employing frequency-division duplexing (FDD). The form discussed assumes that POTS and ADSL will coexist (simultaneously). Of course, the invention is not limited to this ADSL FDD example.

Referring to FIG. 4, an outline of the functional blocks in an ADSL repeater 400 are depicted. For convenience certain functions such as power and control are not shown in FIG. 4. Power and control units can be coupled to the ADSL repeater 400. Although not required, two load coils are shown as part of the repeater 400. When load coils are deployed in a loop, the loop is split and the load coils are spliced in as indicated by the series connections of the inductors (load coils) with the loop. This can be termed in line with loop.

The load coils provide a very high impedance at high frequencies and thus for the range of frequencies where ADSL operates the load coils look essentially like open circuits. The 2w-to-4w arrangement is not explicitly shown in FIG. 4 but is implied. Since the two directions are separated in frequency, the 2w-to-4w arrangement can be quite simple. A bandpass filter BPF isolates the frequency band from 20 kHz to 110 kHz (approximately) and thus the upstream signal is amplified by an amplifier AMP-U. In this particular example, the gain introduced can compensate for the attenuation introduced by approximately 6000 feet of cable at 27 kHz (or approximately the middle of the band). The highpass filters HPF separates out the band above 160 kHz (approximately) and thus the downstream signal is amplified by an amplifier AMP-D. Again, in this particular example, the gain introduced compensates for the attenuation of approximately 6000 feet of cable at 600 kHz (again, roughly the middle of the band).

Since the frequency response of the cable is not "flat" the amplifiers can be designed such that, in conjunction with the filters, they provide a rough amplitude equalization of the cable response over the appropriate frequency band, for example, approximately 20 kHz to 110 kHz upstream and approximately 160 kHz to 1 MHz downstream. The choice of frequency bands is, preferably, 20 kHz to 110 kHz for the upstream direction and 160 kHz to 1.1 MHz for the downstream direction.

If POTS need not be supported, then the load coils are superfluous and can be left "open". Further, if the need for load coils is obviated, the separation of the units becomes a design parameter, independent of load coil placement. A suitable separation of Extenders in this situation is between 7 and 12 kft, and the unit can then be referred to as a "Mid-Span Extender". Clearly, the gains required for the mid-span extender are commensurate with the expected separation.

An ADSL Repeater is well suited for providing ADSL services over long loops which may have been precluded based on loop length and presence of load coils. As described it is a simple mechanism for amplifying the upstream and downstream signals, compensating for the loss in the subscriber loop cable. Separating repeaters by approximately 6000 feet is appropriate since this the nominal distance between points on the cable where load coils were introduced in the past. Cross-over networks based on highpass and bandpass filters can define the upstream and downstream bandwidths used by the DMT-based ADSL units at the CO and CPE operating in a frequency-division duplex mode.

Installing equipment in the cable plant introduces two important considerations. One is the need to provide power. The second is to provide the means to verify operation and isolate problems.

Subscriber loop cable usually comes in bundles of 25 pairs. That is each bundle can provide service to 25 telephone lines. One embodiment of the invention can use the 25 pairs to provide just 20 ADSL connections. This leaves 4 pairs to carry power for the repeaters, and 1 pair to carry control information.

Each 25-pair "repeater housing" can include one controller (microprocessor) and modems that convert the digital control information to (and from) analog for transport over the control pair. These controllers can operate in a "daisy chain" which allows the central office end to query for status, or control the operation of, any repeater housing in the path. For long loops, those exceeding 18 thousand feet, there may be as many as 4 or 5 (or more) repeater housings connected in series (approximately 6000 feet apart). The control information will include commands for maintenance and provisioning information.

The provisioning information relates to the mode of operation of each of the 20 pairs of cable that carry ADSL. One mode is "normal", where the repeater is operating and the load coils are in the circuit. Another mode is "no-ADSL-repeater" wherein the repeaters are not part of the circuit. This latter mode has two "sub-modes". The load-coils may be in the circuit or be removed. The last sub-mode is appropriate if the loop is actually short and we do not need the repeaters and the load coils need to be removed. Of course, other modes of operation can be conceived of.

For test and maintenance purposes, the central office end needs to be capable of forcing any one chosen repeater (on the subscriber loop under test) to enter a loop-back state. That is, a test signal sent from the central office is "looped back" at the chosen repeater and the condition of the loop up to that chosen repeater can be validated. Other test and maintenance features must be provided to support the operating procedures of the phone company.

For providing loop-back through the repeater, the following approach can be used. It can be appreciated that the upstream and downstream signal bands are disparate and non- overlapping. Thus, the notion of loop-back is not simple. One approach can use a two-tone test signal that is within the downstream spectral band. For example, the tone frequencies could be 200 kHz and 250 kHz. When commanded to go into loop-back, the designated repeater introduces a nonlinear element into the circuit. The nonlinear element will create different combinations of the sums and difference frequencies. In particular, the nonlinear element can generate the difference frequency, 50 kHz in the example cited. This signal is within the frequency band of the upstream direction and thus can be looped back. The central office end can monitor the upstream path for this (difference) frequency and thus validate the connectivity up to the repeater in loop-back state.

The form of extender where load coils are not being replaced is the mid-span extender. Placement of a mid-span extender is not constrained by the placement of load coils but, as a matter of practice, the phone company usually has a manhole or equivalent construction where load coils are (normally) situated and these locations would be logical places for deployment of a mid-span extender as well. When a mid-span extender is employed, the load coil removal would follow normal telephone company practice.

Figure 5:
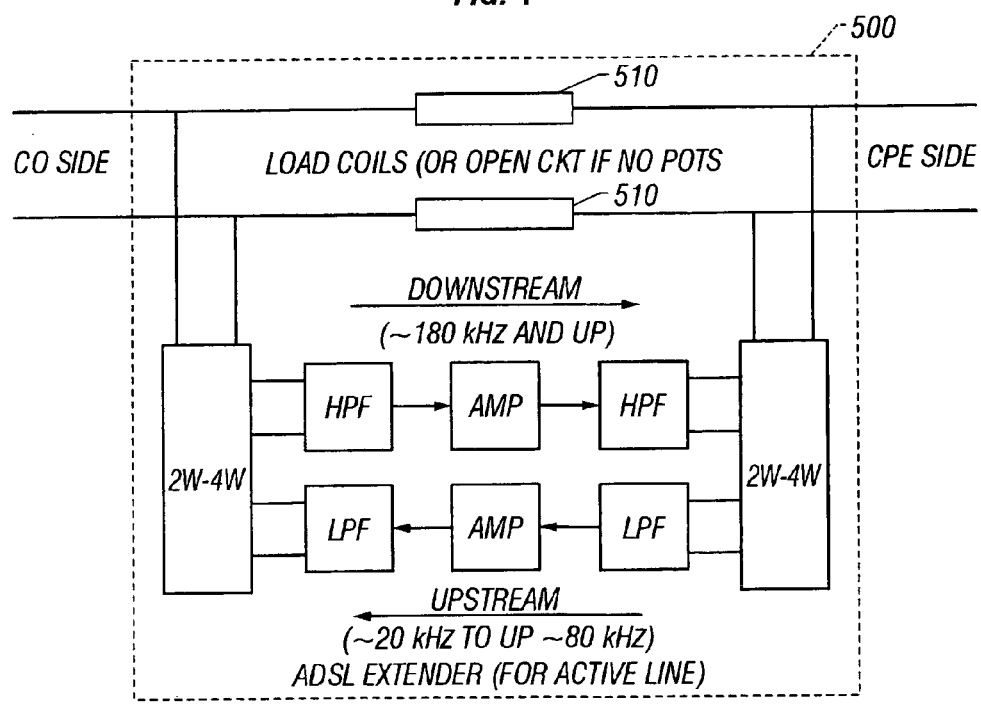
FIG. 5 illustrates a block schematic view of an outline of an extender circuit, representing an embodiment of the invention.

The basic circuit outline 500 of the extender unit is shown in FIG. 5. The extender unit includes a first 2w-4w and a second 2w-4w. For the case of a "load coil replacement", the 88 mH inductors 510 would be present and the gains adjusted for compensating for (roughly) 6000 feet of cable. The same circuit arrangement would apply to the mid-span extender case wherein the 88 mH coils would not be present and the gains adjusted for X feet of cable (X could be in the neighborhood of 10,000 feet).

The natural locations where a repeater or extender can be deployed are those where the telephone company already has manholes or other construction where equipment can be placed and where maintenance personnel have access. The manner in which loop plant has historically been engineered called for such natural locations at points 3 kft, 9 kft, 15 kft., etc. (6 kft spacing) from the central office. Intermediate locations may be accessible in some cases such as where the telephone cable is carried in an aerial manner, using telephone poles, rather than in a buried or underground fashion. Furthermore, the separation rule of 6 kft may not be followed exactly based on availability of right-of-way and land for the telephone company to construct manholes or environmentally controlled vaults.

The fundamental premise of the extender is to put amplification in-line with the signal. In lay terms, the extender compensates for the loss of X kft of cable. In a manner of speaking, the combination of X kft of cable and the extender is equivalent to 0 kft of cable. However, this is not entirely true for the following reasons. First, the compensatory gain applied may not compensate for different lengths of cable in the upstream and downstream directions. Second, the filtering action implied renders some portion of the spectrum unavailable for transmission of information. Third, the frequency response of the cable is not flat with frequency and is determined by the parameters of the cable, which is a distributed-component system, and thus, since the filters must have a predetermined frequency response characteristic using lumped components, the roll-off compensation may not be exact. For purposes of illustration, however, this rudimentary model will suffice.

The nature of the ADSL transmission units, the ATU-R (remote) at the subscriber end and the ATU-C (central) at the Central Office end, is such that they normally function with loops that are less than about 12 kft in length. That is, for a nominal data rate, typically 1536 kbps downstream and 128 kbps upstream, the loop length must be kept to less than 12 kft. There is some difference of opinion in the industry as to whether the loop length limit for such data rates is indeed 12 kft or whether it is 18 kft. Nevertheless, it is well understood that longer the loop the lower is the supportable bit rate. In practice we can find loops that are longer than 12 kft that support higher bit rates than mentioned but it is also true, based on anecdotal evidence, that there are loops shorter than 12 kft that cannot support these bit rates. Considerable variation in bit rates can be observed depending on the nature of the cable plant, the mix of wire gauges, the presence of bridged-taps, the mix of traffic carried in adjacent cable pairs in the same bundle, and so on. Every Telephone Company has its own Operating Procedures for designating distance and supported data rate; 12 kft with 1536/128 kbps (downstream/upstream data rates) are mentioned here as being quite typical. Thus if we design the extender and/or repeater to compensate for 12 kft of cable, then we can, in theory, provide for loops as long as 24 kft (somewhat less in practice for the reasons given earlier). However, if we have a fixed design, with fixed amplifier gains, then the deployment of a repeater at 12 kft in the case where the subscriber unit is slightly further than 12 kft may be problematic for reasons that will be described below. It is this drawback that we discuss next as well as indicate how our proposed method provides the solution to the problem.

In order to compensate for 12 kft of 26-gauge subscriber cable, typical values for gain are 35 dB in the upstream direction and 48 dB in the downstream direction. These values of gain are arrived at by computing an "average" loss in the cable taking into account the relevant frequency bands of transmission in the two directions. Clearly the filters in the repeater that separate the two directions must provide adequate cross-over loss to prevent the repeater circuitry from exhibiting an oscillatory behavior mode. Now the repeater is going to be some distance from the central office that can be predetermined. The distance between the repeater and the subscriber is, however, not constrained. Thus, if the repeater is very close to the subscriber unit, (i.e., the ATU-R), then the attempt to provide 35 dB of gain may result in a signal level that is too high for the circuitry in the repeater to handle without going into a saturation mode. This is a fundamental problem. That is, if a fixed gain is specified for the upstream direction, then the dynamic range required in the upstream amplifiers, in order that a close-in subscriber unit does not cause saturation, may be excessive.

Some typical signal levels are provided here to illustrate this point. The maximum output power of the ATU-C is specified in terms of a power-spectrum mask which sets the upper limit as roughly −36.5 dBm/Hz, assuming a 100 ohm termination, over a frequency range between 30 kHz and 1.1 MHz. This corresponds to a worst-case (maximum) signal power of about 250 milliwatts or 24 dBm. This implies that the rms ("root-mean-square") voltage is 5 volts. In order to support a signal of this strength without going into saturation, the amplifier needs to have a dynamic range (specifically a maximum output amplitude) of much larger than 5 volts. This maximum is based on the nature of the signal and is quantified in terms of the "crest factor". It should be noted that even though the ADSL standard specifies the maximum power (ATU-C) via a spectral mask that corresponds to a maximum power of 250 milliwatts, it is common telephone company practice, and therefore followed by several manufacturers of ATU-C equipment, to limit the power to about 100 milliwatts.

The crest factor of a signal is defined as the ratio of the peak-value to the rms-value and is often expressed in decibel notation. For example, the crest-factor for a sine-wave is 3 dB or, equivalently, the ratio of peak value (the amplitude of the sine-wave) and the rms value is 1.414 (actually the square-root of 2). The waveforms generated by ADSL modems tend to be more "peaky" in nature than sine-waves and it is generally agreed that the crest-factor applicable for ADSL signals is between 12 dB and 16 dB. The reason for this range is that the notion of "peak" value is not well defined for random signals and is based on probability. The notion of "peak" value is that value such that the probability of the signal voltage exceeding that value is very small.

Depending on what is considered a "small" value of probability, the notion of peak value, and thus crest-factor, may differ. In the following discussion we will generally assume a crest-factor of 16 dB and indicate wherever we deviate from this choice. With this choice, an ADSL signal of power x dBm will have the same peak value as a sine-wave of power x+13 dBm. This equivalence facilitates the computation of required dynamic range since the relationship between power and amplitude is well defined and commonly understood for a sine-wave.

For an ADSL signal of 24 dBm, the dynamic range of the amplifier (output) must be adequate to support a sine-wave of 37 dBm and considering an impedance of 100 ohms, the amplitude of a 37 dBm sine-wave is 31.7 volts. Since we require the source impedance to be 100 ohms as well, the actual dynamic range required for the amplifier that is driving the 100 ohm load through a 100 ohm source impedance is ±64 volts.

The nominal maximum power of the ATU-R signal, at the ATU-R itself, is specified as a spectral mask of roughly −34.5 dBm/Hz over the frequency range of interest (roughly 100 kHz) and this translates to a power level of about 15.5 dBm (about 35.5 milliwatts). The peak-equivalent sine-wave power is 28.5 dBm which translates to an amplitude approximately 12 volts. If the repeater is 0 kft from the ATU-R and the repeater intends to provide 35 dB of gain in the upstream direction, the circuitry must be capable of providing peak voltage levels of the order of 1000 volts! This is not economically feasible with any technology available today. It should be noted that even though the ADSL standard specifies the maximum power (ATU-R) via a spectral mask that corresponds to a maximum power of 35.5 milliwatts, it is common telephone company practice, and therefore followed by several manufacturers of ATU-R equipment, to limit the power to about 10 milliwatts.

The solution to this problem is provided here. In particular, we show that it is feasible to design the repeater such that it is optimized to provide the longest loop length assuming a mid-span approach is used. We shall assume that the dynamic range of the amplifiers is ±12 volts for specificity though it will be clear what alterations need to be made to accommodate any other voltage range. With this choice, the maximum sine-wave power that can be delivered through a 100 ohm source impedance into a 100 ohm load is 22.6 dBm. Assuming a crest-factor of 16 dB, the peak-equivalent maximum ADSL signal power is 9.6 dBm (about 9 milliwatts); assuming a crest-factor of 13 dB, the peak-equivalent maximum ADSL signal power is 12.6 dBm (about 18 milliwatts).

The notion of automatic gain control (AGC) is well understood and is used in a wide variety of applications. AGC is achieved by monitoring the signal strength of the output signal, usually in terms of peak value, and thereby generating a control signal (voltage) for adjusting the gain of a voltage-controlled-variable-gain amplifier. This notion of providing AGC is prescribed for the ADSL Repeater. The principle of the scheme is depicted in FIG. 6.

Figure 6:
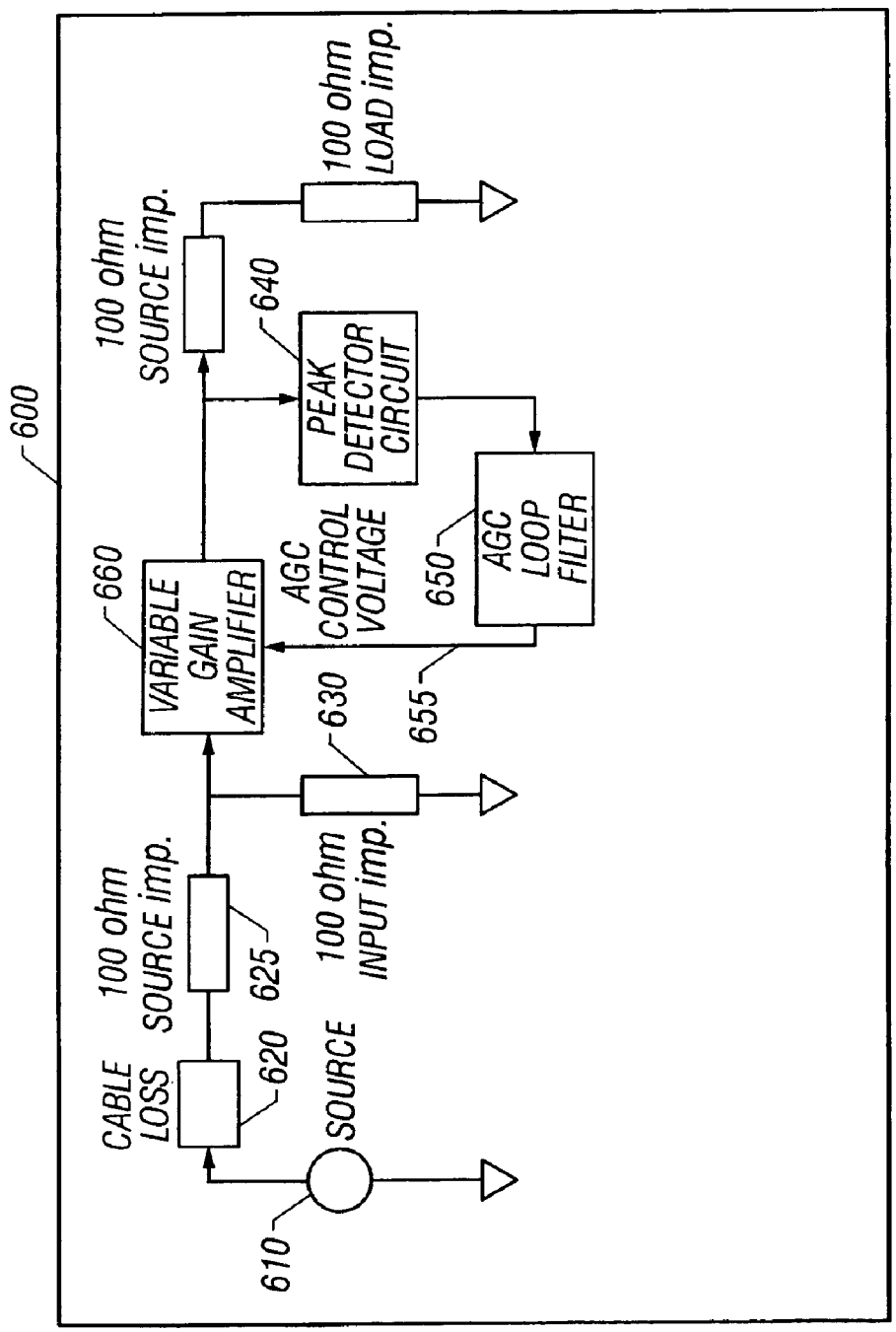
FIG. 6 illustrates a block schematic view of an equivalent circuit for depicting automatic gain control operation, representing an embodiment of the invention.

Referring to FIG. 6, an extender 600 includes an AGC (automatic gain control) capability. A source 610, either the ATU-R or the ATU-C, is modeled as a signal generator. The intervening cable between the source and the extender will have a certain loss depending on length, wire-gauge, and signal frequency. This loss is depicted in FIG. 6 as a block 620 labeled "Cable loss". For ADSL, the standard source and input impedances are both 100 ohms. Hence we have shown blocks 625, 630 representing 100 ohm source/load impedances, respectively. A peak detector circuit 640 comprises circuitry to establish the peak, including smoothing, and in conjunction with an automatic gain control loop filter 650 (AGC Loop filter), a signal for establishing the gain of the amplifier chain. An "AGC Control Voltage" 655 is generated by the peak detector circuit 640. The AGC control voltage 655 is fed to a variable gain amplifier 660. The actual amplification is depicted as a single block though it may be implemented as a cascade of amplifiers. The key characteristic is that the overall gain is a function of the control voltage. By adjusting the control voltage we are adjusting the gain of the amplifier 600 (or chain of amplifiers). In essence, the gain of the amplifier 660 is controlled such that the peak excursions of the output signal are, roughly, equal to a prescribed value. For example, if the amplifier output voltage 655 range is ±12 volts, then the gain is controlled such that the peaks rarely exceed ±11.5 volts and thus the probability of the amplifier 660 going into saturation is extremely small. It is common practice with AGC amplifiers to preset minimum and maximum gain values so that the gain never falls below the minimum specified value and nor does it ever exceed the maximum prescribed value.

A similar model is applicable for both the upstream and downstream directions. That is, we can prescribe AGC for the upstream and downstream directions independently and thus we will be providing the "maximum possible" gain in each direction. This is the "optimal" architecture. The drawback is that separate peak detector and loop filters are required for the two directions. If power dissipation and/or material cost constraints are severe, then the enhancement proposed immediately below is valuable. Specifically, we note that the control voltage derived by monitoring the output amplifier of the upstream direction can be used to adjust the gain of the amplifier gains in both the upstream and downstream directions.

The amplifier chains in the upstream and downstream directions are designed to provide a certain maximum gain. This maximum gain is related to the characteristics of the filters that separate the upstream and downstream spectral regions so that, as discussed previously, the repeater does not exhibit an oscillatory behavior. For example, the nominal maximum gain of the downstream direction can be set at 56 dB and the nominal maximum gain in the upstream direction can be set at 41 dB. These values are appropriate to compensate for, approximately, the loss introduced by 14 kft of 26-gauge subscriber cable. As mentioned before, we assume that the circuitry is capable of supporting a peak signal of 12 volts without saturation. That is, the amplifiers can drive a sine-wave power of about 22.6 dBm (125 milliwatts) into a 100 ohm load through a 100 ohm source impedance. The corresponding ADSL signal power (peak-equivalent) is 9.6 dBm (9 milliwatts). If we can assume that the crest-factor is somewhat less than the assumed 16 dB, and the ATU-R provides a maximum output power of 10 milliwatts, the repeater amplifiers will not saturate with a gain of 0 dB. That is, the "minimum" gain setting in the upstream direction can be set at 0 dB.

To establish the minimum gain in the downstream direction we shall assume that the ATU-C maximum output power is 100 milliwatts (20 dBm). Further we assume that the loop length between the extender and the ATU-C is greater than 9 kft of 26-gauge subscriber loop cable. The nominal frequency range of the downstream signal is between 160 kHz and 1.1 MHz and over this range the attenuation of 9 kft of cable varies from about 33 dB (160 kHz) to 70 dB (1 MHz). We believe that for purposes of this power calculation, an "average" attenuation of 44 dB is appropriate. That is, the maximum input (ADSL) signal power at the extender, from the central office side, is roughly −24 dBm. Considering that the output amplifiers can support an output (ADSL) power level of 9.6 dBm, the "minimum" gain setting for the downstream amplifier chain can be prescribed as 33 dB (or 33.6 dB to be more precise). It turns out that 33 dB of gain, from the viewpoint of extender functionality, is appropriate to compensate for about 8 kft of 26-gauge subscriber cable.

The design parameters for the peak-detector and variable-gain amplifier are such that in the upstream direction the gain of the amplifier chain is controlled such that, on the average, the peak signal of the upstream output amplifier is greater than ($12_A$) volts only for a very small fraction of the time. For example, the peak-detector could provide a voltage that is proportional to the time that the output amplifier output is greater than 11 volts. This would control the gain of the upstream amplifier chain as well as the downstream amplifier chain. The consequence of this feedback operation is that the overall gain of the upstream amplifier chain will settle at a value such that the peak value exceeds 11 volts only a small fraction of the time and thus the probability of the amplifier going into saturation is extremely small.

We can summarize the design methodology for the Mid-Span Extender in a qualitative fashion as follows: the approach is well suited for a Mid-Span Extender for long loops where the specific positioning of the Extender in the loop is flexible. For example, the extender may be placed anywhere between 9 kft and 15 kft from the central office. A method of operating the invention can include setting the maximum gain in each direction to compensate for some length of cable (14 kft in the above explanation). The method can include monitoring the upstream signal at the output of the (upstream) amplifier chain. Based on the strength of this signal (basically peak value), the method can include adjusting the gain in both directions. The AGC philosophy tries to ensure that clipping does not occur in the upstream direction. Since the extender is at some minimum distance from the central office, clipping in the downstream direction is not as important an issue. The variable gain amplifier in the downstream direction is configured to have a minimum gain, typically that corresponding to the compensatory gain for a cable run of slightly less than the minimum distance expected to the central office.

ADSL Repeater Upstream Automatic Gain Control

Repeaters, as a general class of device for reamplifying and/or regenerating a signal, often display the characteristic of correct and compensatory operation over a wide range of incident signal power levels, such that the variation in transmitted power across multiple links is much less than the corresponding variation in received power. The necessity for limited transmitted power variability is typically due to a combination of regulatory, technical and fitness-for-use limitations. Regenerating repeaters which perform an analog-to-digital-to-analog function usually adapt to receiver power variations in their initial analog stages, and may use either automatic gain control (AGC) or an adaptive digitization threshold. Fully-analog reamplifying repeaters are constrained to use an AGC of some form.

An AGC methodology may be used in a reamplifying repeater for ADSL signals. Such repeaters, when installed midspan, operate bidirectionally, amplifying both downstream and upstream directions, i.e., both toward the customer and toward the central office, respectively. The deployment of such repeaters can include constraining their downstream gain within somewhat narrow bounds, since their distances from the central office are known at the time of installation. Further, their distances from the central office may be similar for all repeaters at a particular installation site. However, the distances between the repeaters and the customer modems are not correspondingly similar, nor are they necessarily predictable since repeaters may be installed prior to the assignment of those repeaters to different customers. The distance from repeater to modem may range from essentially zero to several thousand feet, representing a dynamic range of attenuation of over 30 dB within the upstream frequency band. No single upstream gain characteristic can satisfy both power-limitation and performance requirements across such a dynamic range. An AGC is the natural approach to solving this problem. However, there is a confounding issue, which will be described next.

AGC-ATU Interference in an ADSL Link

The central office DSLAM and the customer modem perform the functions of ADSL terminal units (ATUs), with the DSLAM being the ATU-C (central) and the modem being the ATU-R (remote). In establishing an ADSL link, the ATU-C and ATU-R first operate in a handshake mode, during which they learn the characteristics of the path between them, including attenuation and noise margin versus frequency. This handshake mode causes the downstream and upstream power levels to fluctuate across a large range, although always within permissible limits. The ATUs then negotiate the allocation of their downstream and upstream bit rates to various frequency bins, in an attempt to optimize performance within their learned constraints. Once all negotiation is complete, they proceed with "showtime," when the actual user traffic is carried on the link. During showtime, downstream and upstream power levels are essentially stable.

During the handshake process, any variation in the link characteristics as perceived by the ATUs might easily be interpreted as a degradation in signal integrity, with a measurable decrease in signal-to-noise ratio. The result will be either complete failure to link, or at best a reduction in the negotiated performance level, manifested as a lower bit rate than could be achieved in the absence of the variation.

Similarly, from the point of view of the repeater's upstream AGC, any variation in the upstream signal level, such as occurs during handshake, may cause the AGC to attempt to counteract the variation by changing its gain.

To summarize these points, the AGC can interfere with the handshake of the ATUs, and vice-versa. There is a definite danger that this mutual interference will either completely prevent establishment of a link, or result in much worse performance than can theoretically be achieved. Reduction or elimination of this risk requires that the AGC be designed with sufficient sophistication to allow the handshake to occur without interference, while maintaining its capability to end up in the optimum state. Finally, good design requires that the AGC permit the link to be established within a reasonable time; solutions that avoid interference effects by merely slowing down the dynamics of the AGC are relatively simple, but may take inordinately long to settle, depending on the number of gain steps provided, and the particular gain selection algorithm used. The embodiments of the invention described below satisfy these requirements.

In the particular embodiment described below, the downstream path is assumed to have no AGC at all, although the invention can be implemented in the presence of a downstream AGC. The repeater's upstream path contains an AGC, which may contain elements of feedback, feedforward, or both; as such it must contain a power-measuring capability and a gain-varying capability, with the latter preferably being controlled by the former. The power-measuring capability should either directly or indirectly compare the repeater's upstream output power to at least two different thresholds. The AGC can cause the upstream output power during the showtime to have a value between two thresholds, an upper threshold chosen to guarantee non-violation of the PSD mask, and a lower threshold chosen to ensure satisfactory performance. The power-measuring capability can be derived from a circuit (e.g., voltage and current sensors) and/or software. The gain-varying capability should adjust the gain to meet these criteria. Further, the gain varying capability should produce a gain step smaller than that represented by the upper and lower upstream output power thresholds, thereby guaranteeing sufficient hysteresis to avoid oscillation of the AGC. The gain-varying capability may be either continuous or discrete, but in any case should not introduce excessive distortion. The gain-varying capability can be derived from a circuit (e.g., operational amplifier) and/or software.

In addition to the information from the power-measuring capability, the invention can also include information about the downstream power level, provided by a detector. This information is contained in one bit, which indicates either activity (such as during showtime and parts of handshake), or inactivity (such as when the link is down, or during certain other parts of handshake).

The information from the upstream power-measuring capability, representing as it does at least three distinct states (i.e., above the upper threshold, below the lower threshold, or between the two) should include at least two bits. Including the one bit from the downstream detector, at least three bits of information are thus available for analysis at any time. To summarize, these three bits tell whether the upstream power is above the upper threshold, below the lower threshold, or between the two, and also whether downstream power is present or not. If more bits are provided, then this knowledge may be more precise. These bits as a whole can be termed the "repeater state." These bits as a whole can also be referred to as the "extender state."

The AGC can also include a link-termination capability, which is capable of shutting off all power through the repeater in the upstream direction. The link-termination capability can be derived from a circuit (e.g., relay) and/or software.

Figure 7:
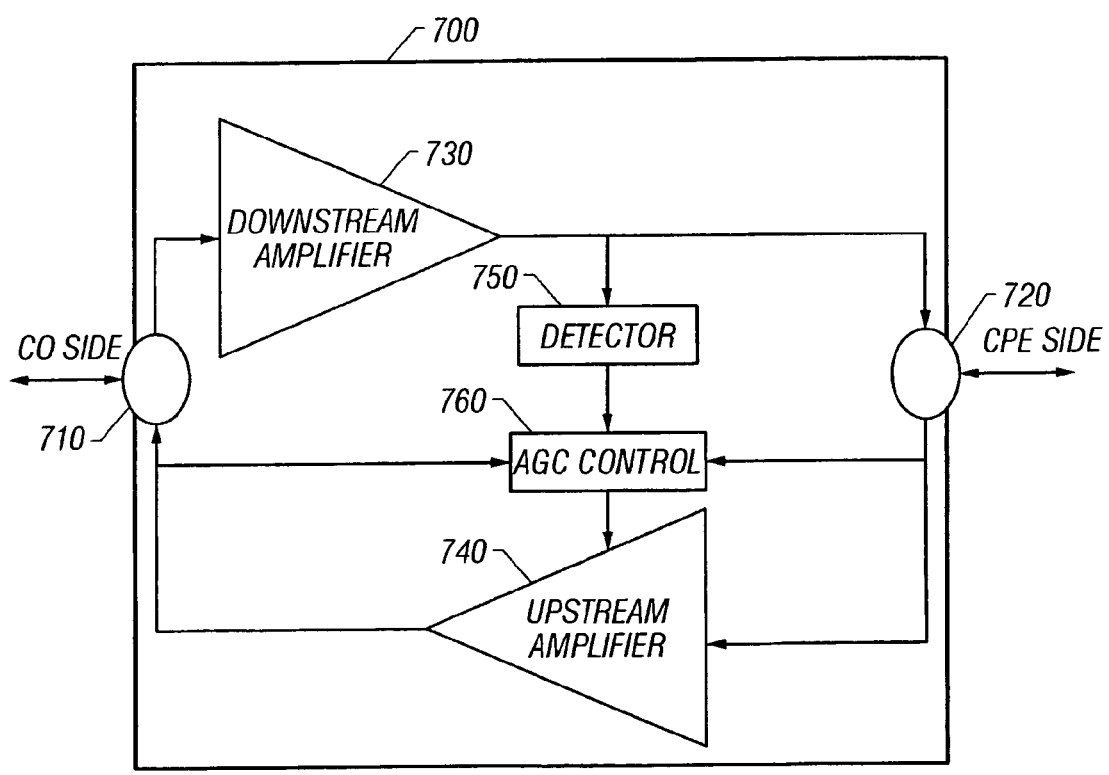
FIG. 7 illustrates a block schematic view of a bi-directional ADSL repeater with upstream AGC, representing an embodiment of the invention.

FIG. 7 depicts a simple block diagram of a system that embodies the invention. An extender 700 includes a CO side connector 710 and a CPE side connector 720. A downstream amplifier 730 is coupled to the CO side connector 710 and the CPE side connector 720. A detector 750 is coupled to an output of the downstream amplifier 730. A upstream amplifier 740 is coupled to the CO side connector 710 and the CPE side connector 720. An AGC control unit 760 is coupled to the CO side connector 710, to the CPE side connector 720 and between the detector 750 and the upstream amplifier 740. The AGC control unit 760 can include an AGC algorithm.

The AGC algorithm can dictate how the gain-varying capability operates according to the repeater state at any time. An objective of the algorithm is to, if possible, change the gain until the upstream output power is between the upper and lower thresholds, then force link termination and reacquisition if necessary to ensure that the last handshake occurs entirely while the gain is stable.

In the present invention, the algorithm can include a set of rules which may be stated generally as follows. If the upstream output power is persistently below the lower threshold while downstream power is present, and if the gain can go up, then increase the gain. If the upstream output power is persistently above the upper threshold while downstream power is present, and if the gain can go down, then decrease the gain. If either of the above two rules would change the gain but for the fact that the gain is at one of its limits, and if downstream power is present, and if this state persists, then either witness link termination and reacquisition since the last gain change, or force it; then keep the gain unchanged for a while. If the upstream output power is persistently between the upper and lower thresholds, then once downstream power is present, either witness link termination and reacquisition since the last gain change, or force it; then keep the gain unchanged for a while. If the repeater state persistently indicates a "dead" line, in that downstream power is absent and upstream output power is below the lower threshold, then progressively increase or decrease the gain, reversing the direction of change when the gain reaches its limits. In all other conditions, leave the gain unchanged.

A more specific version of these rules is as follows. If downstream power is present, and upstream power level is below the lower threshold, and the upstream gain is not at its maximum, and this state persists for at least a duration (Tup), then cause the upstream gain to increase. If downstream power is present, and upstream power level is above the upper threshold, and the upstream gain is not at its minimum value, and this state persists for at least a duration (Tdown), then cause the upstream gain to decrease. If downstream power is present, and the upstream power level is between the lower and upper thresholds, or if downstream power is present, the upstream power level is below the lower threshold, and the upstream gain is at its upper limit, or if downstream power is present, the upstream power level is above the upper threshold, and the upstream gain is at its lower limit, and if this state persists for at least a duration (Tnormal), and downstream power should then be present, and if the history of the repeater state since the last gain change does not indicate both at least one instance of absence of downstream power and at least one instance of an upstream power level below the lower threshold (not necessarily at the same times), then terminate the link via the upstream link-termination capability, until the downstream power is no longer present, or a maximum duration of link termination (Tshutdown) has elapsed, and then cease termination of the link, and then keep the gain unchanged for a subsequent duration (Tsleep). If the upstream power level is between the lower and upper thresholds, or if downstream power is present, the upstream power level is below the lower threshold, and the upstream gain is at its upper limit, or if downstream power is present, the upstream power level is above the upper threshold, and the upstream gain is at its lower limit, and if this state persists for at least a duration (Tnormal), and the downstream power should then be present, and if the history of the repeater state since the last gain change indicates both at least one instance of absence of downstream power and at least one instance of an upstream power level below the lower threshold (not necessarily at the same times), then keep the gain unchanged for a subsequent duration (Tsleep). If downstream power is absent, and the upstream power level is below the lower threshold, and if this state persists with the same gain setting for at least a duration (Tdead), then change the gain in the same direction as the last change (decrease gain if this is the first change), unless the gain has reached either its minimum or maximum value, in which case reverse the direction of change. If any other condition exists, leave the gain unchanged.

Figure 8:
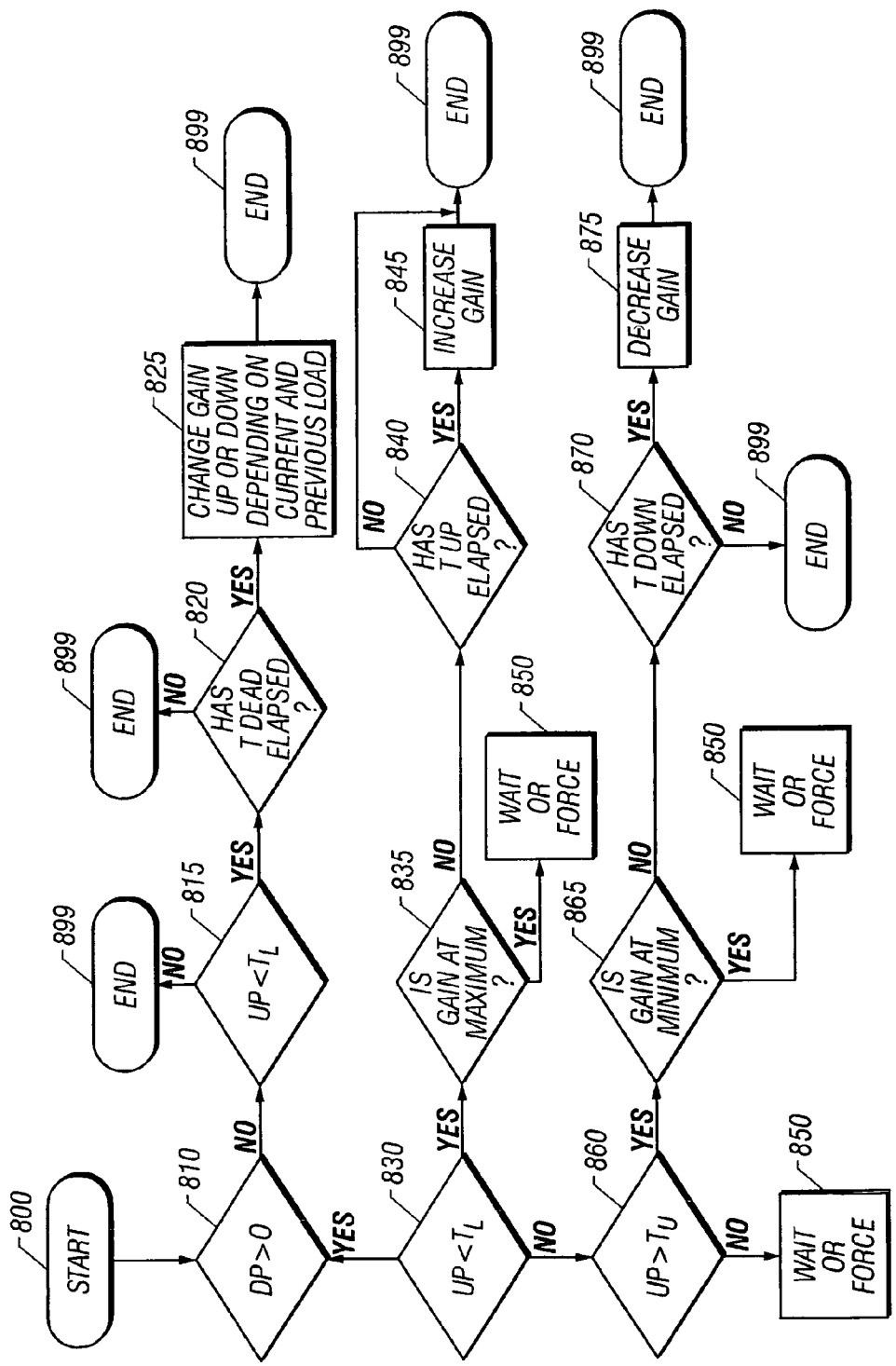
FIG. 8 illustrates a flow diagram of a process that can be implemented by a computer program, representing an embodiment of the invention.
Figure 9:
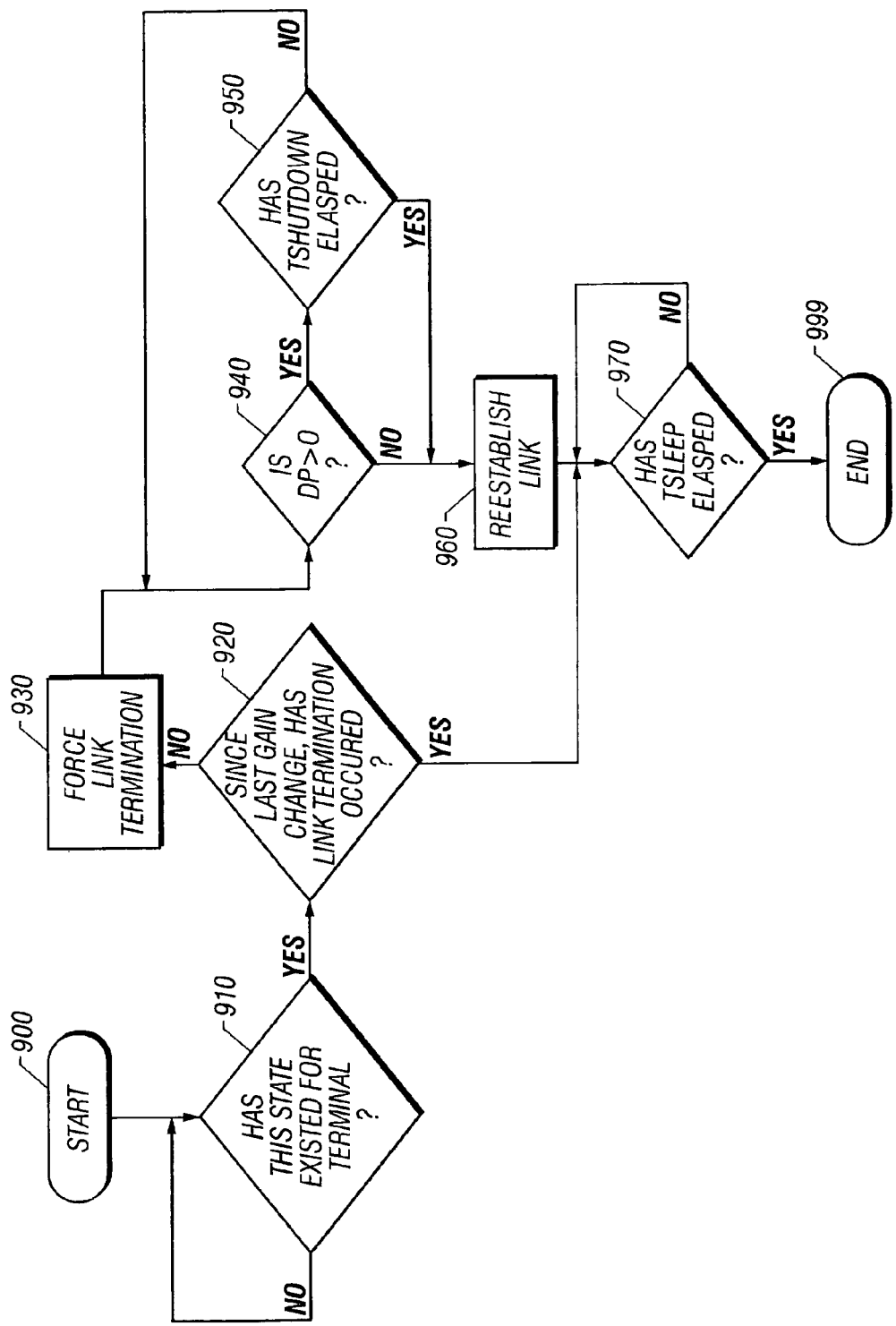
FIG. 9 illustrates a flow diagram of a wait or force auxiliary operation that can be implemented by a computer program, representing an embodiment of the invention.

This algorithm is also depicted in FIGS. 8–9. Of course, this algorithm is just an example of a way in which the invention could be embodied and the invention is not limited to this embodiment.

Referring to FIG. 8, the algorithm begins at a start point 800. At block 810 a determination is made whether the downstream power is positive. If the downstream power is positive, a determination is made at block 830 of whether the upstream power is less than a lower threshold. If the upstream power is not less than the lower threshold, a determination is made at block 860 of whether the upstream power is greater than an upper threshold. If the upstream power is not greater than the upper threshold, the algorithm enters a wait or force auxiliary operation at block 850. The block 850 will be described in more detail below with reference to FIG. 9.

Still referring to FIG. 8, if the downstream power is not positive, a determination is made at block 815 of whether the upstream power is less than the lower threshold. If the upstream power is not less than the lower threshold the algorithm proceeds to an end at block 899. The end represented by block 899 can be a complete termination, a dwell period before the algorithm returns to an earlier point in the algorithm (e.g., start point 800) or a direct go to an earlier point in the algorithm.

Still referring to FIG. 8, at block 815, if the upstream power is less than the lower threshold, a determination is made at block 820 of whether a time interval Tdead has elapsed. If the time interval Tdead has not elapsed, the algorithm proceeds to the end 899. If the time interval Tdead has elapsed, the gain is incremented at block 825 in the same direction it was previously incremented, unless the gain is at a limit in which case the gain is incremented away from the limit (at first the gain is incremented down). After block 825, the algorithm proceeds to the end at block 899.

Still referring to FIG. 8, at block 830, if the upstream power is less than the lower threshold, a determination is made at block 835 of whether the gain is at a maximum. If the gain is at a maximum, the algorithm proceeds to the wait or force 850. If the gain is not at a maximum, a determination is made at block 840 of whether a time interval Tup has elapsed. If the time interval Tup has not elapsed, the algorithm proceeds to the end 899. If the time interval Tup has elapsed, the gain is increased at block 845. After block 845, the algorithm proceeds to the end at block 899.

Still referring to FIG. 8, at block 860, if the upstream power is greater than the upper threshold, a determination is made at block 865 of whether the gain is at a minimum. If the gain is at a minimum, the algorithm proceeds to the wait or force 850. If the gain is not at a minimum, a determination is made at block 870 of whether a time interval Tdown has elapsed. If the time interval Tdown has not elapsed, the algorithm proceeds to the end 899. If the time interval Tdown has elapsed, the gain is decreased at block 875. After block 875, the algorithm proceeds to the end at block 899.

Referring to FIG. 9, the wait or force operation will now be described in more detail. The wait or force operation can begin at block 900 after which a determination is made at a block 910 of whether a state defined by the extender at the time the algorithm entered the wait or force operation has existed for a time interval Tnormal. If the state has not existed for the time interval Tnormal, the algorithm loops back to block 910 to wait. If the state has existed for the time interval Tnormal, a determination is made at block 920 of whether a link termination has occurred since the last gain change. At block 920, if a link termination has occurred since the last gain change, the algorithm goes to block 970 which will be discussed below.

Still referring to FIG. 9, at block 920, if a link termination has not occurred since the last gain change, a link termination is forced at block 930. At block 940 a determination is made of whether the downstream power is positive. If the downstream power is not positive, the link is reestablished at block 960. A determination is then made at block 970 of whether a time interval Tsleep has elapsed. If the time interval Tsleep has elapsed, the algorithm proceeds to the end block 999. If the time interval Tsleep has not elapsed, the algorithm loops back to block 970 to wait.

Still referring to FIG. 9, at block 940, if the downstream power is positive, a determination is made at block 950 of whether a time interval Tshutdown has elapsed. If the time interval Tshutdown has elapsed, the algorithm proceeds to block 960. If the time interval Tshutdown has not elapsed, the algorithm loops back to block 940.

In order for this algorithm to function well, the various predetermined durations must be chosen wisely, and with consideration of both the typical duration of the handshake process and the manner in which ATUs such as ADSL modems recover from link drops. Suggested values which have been tried with favorable results appear below.

| Duration (name) | Suggested value | If too low . . . | If too high . . . |
|---|---|---|---|
| Tup | 3 sec | Risk of incorrectly increasing gain during handshake | Unnecessarily long total acquisition time |
| Tdown | 0.5 sec | Risk of incorrectly decreasing gain due to transient noise | Unnecessarily long total acquisition time, extended PSD violation |
| Tnormal | 9 sec | Risk of invoking link-termination capability prior to completion of handshake, possibly causing prolonged link drop | Unnecessarily long acquisition time |
| Tshutdown | 10 sec | Risk of not terminating link | Unnecessarily long acquisition time |
| Tsleep | 25 sec | Risk of incorrectly changing gain if final link acquisition does not succeed, further adding delay | Risk of prolonged operation with incorrect gain (unexpected, but to be avoided if possible) |
| Tdead | 10 sec | Risk of incorrectly changing gain between link attempts | Unnecessarily long acquisition time |

An ADSL repeater without an AGC in the upstream path cannot optimize its performance across a large range of distances to the customer's modem; however, an ADSL repeater with an AGC risks significant degradation of either link acquisition time or performance, due to the inevitable coupling between the AGC and the ATUs at each end of the link during the handshake process. The invention can provide both reasonably short acquisition (often under 1 minutes, almost always under 2 minutes) and the full performance benefit promised by a repeater, thanks to an intelligent algorithm which can have the following attributes. The invention can recognize power fluctuations occurring during handshake, and does not over-react to them. The invention can rapidly perform gain adjustments when sufficient information is available to warrant them. The invention can recognize that failure to link can occur due to either insufficient gain or excessive gain, and has a mechanism to prevent permanent "sticking" in either condition (namely, the alternating-direction searching method that occurs when downstream and upstream power are both absent). The invention can recognize that the process of gain adjustment can degrade the negotiated bit rate if it occurs during handshake, and consequently forces a final handshake while the gain is held stable, unless it is obvious that the last handshake did occur with stable gain throughout.

The invention can also utilize data processing methods that transform signals from the digital subscriber loop to actuate interconnected discrete hardware elements. For example, to remotely fine-tune (gain adjustment and/or band-pass adjustment) and/or reconfigure (downstream/upstream reallocation) repeater(s) after initial installation using network control signals sent over the DSL.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

PRACTICAL APPLICATIONS OF THE INVENTION

A practical application of the invention that has value within the technological arts is local digital subscriber loop service. Further, the invention is useful in conjunction with digital subscriber loop networks (such as are used for the purpose of local area networks or metropolitan area networks or wide area networks), or the like. There are virtually innumerable uses for the invention, all of which need not be detailed here.

ADVANTAGES OF THE INVENTION

A digital subscriber loop repeater, representing an embodiment of the invention can be cost effective and advantageous for at least the following reasons. The invention permits DSL to be provided on long loops. The invention permits DSL to be provided on loaded loops. The "Transmux" scheme is superior to the agreed upon standard, called "DMT", especially in situations where the separation of upstream and downstream traffic is achieved using filters; that is, in the Frequency Division Duplexing (or FDD) mode of operation. The new scheme is especially appropriate for providing ADSL over long subscriber loops which require "repeaters" or "extenders". While conventional DSL installation requires that all load coils be removed from a loop, the invention can include the replacement of these load coils with what can be termed an "ADSL Repeater" or "ADSL Extender". In particular, using ADSL Repeaters (in place of load coils), one particular form of ADSL that uses the technique of frequency-division-duplexing can be provided to customers over very long loops. A variation of the Repeater is the "Mid-Span Extender" where the unit is not necessarily placed at a load coil site. In addition, the invention improves quality and/or reduces costs compared to previous approaches.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein. Further, although the digital subscriber loop repeaters described herein can be separate modules, it will be manifest that the repeaters may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. Walter Y. Chen, *DSL. Simulation Techniques and Standards Development for Digital Subscriber Line Systems*, Macmillan Technical Publishing, Indianapolis, 1998. ISBN: 1-57870-017-5.

2. Padmanand Warrier and Balaji Kumar, *XDSL Architecture*, McGraw-Hill, 1999. ISBN: 0-07-135006-3.
3. "G.992.1, Asymmetrical Digital Subscriber Line (ADSL) Transceivers," Draft ITU Recommendation, COM 15-131.
4. "G.992.2, Splitterless Asymmetrical Digital Subscriber Line (ADSL) Transceivers," Draft ITU Recommendation COM 15-136.
5. Kishan Shenoi, *Digital Signal Processing in Telecommunications*, Prentice-Hall, Inc., Englewood Cliffs, N.J., 1995. ISBN: 0-13-096751-3.
6. The Electrical Engineering Handbook, CRC Press, (Richard C. Dorf et al. eds.), 1993.
7. ANSI, T1.413-1988.

What is claimed is:

1. A method, comprising extending a digital subscriber loop including:
    producing an output signal in a first direction from a first variable gain amplifier at a mid-span extender unit responsive to an input signal in the first direction from said digital subscriber loop;
    monitoring a signal strength of said output signal in the first direction at said mid-span extender unit;
    generating a gain control signal responsive to said signal strength at said mid-span extender unit;
    controlling a first gain of said first variable gain amplifier at said mid-span extender unit responsive to said gain control signal;
    controlling a second gain of a second variable gain amplifier at said mid-span extender unit responsive to said gain control signal to produce an output signal in a second direction from said second variable gain amplifier at said mid-span extender unit responsive to a second input signal in said second direction from said digital subscriber loop; and
    detecting whether a downstream signal is present on said digital subscriber loop,
    wherein controlling said gain of said first variable gain amplifier includes determining when to change said gain of said first variable gain amplifier based on at least one elapsed time interval selected from the group consisting of Tnormal, Tshutdown, Tsleep, and Tdead, where Tnormal is a duration that persists while i) said downstream signal is present, and said gain of said first variable gain amplifier is between a lower threshold and an upper threshold, or ii) said downstream signal is present, an upstream power level is below a lower threshold, and said gain of said first variable gain amplifier is at an upper limit, or iii) said downstream signal is present, said upstream power level is above an upper threshold, and said gain of said first variable gain amplifier is at a lower limit, where Tshutdown is a maximum duration of link termination, where Tsleep is a subsequent duration, and where Tdead is a duration that persists with a same gain setting while said downstream signal is not present and a control signal is below a low threshold.

* * * * *